(12) United States Patent
Nakamura et al.

(10) Patent No.: US 12,263,839 B2
(45) Date of Patent: Apr. 1, 2025

(54) STOP POSITION CONTROL SYSTEM, STOP POSITION CONTROL METHOD, AND STOP POSITION CONTROL DEVICE

(71) Applicant: Nissan Motor Co., Ltd., Kanagawa (JP)

(72) Inventors: Masahide Nakamura, Kanagawa (JP); Yutaka Mikuriya, Kanagawa (JP); Yoshitaka Takagi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 221 days.

(21) Appl. No.: 17/907,356

(22) PCT Filed: Mar. 27, 2020

(86) PCT No.: PCT/IB2020/000307
§ 371 (c)(1),
(2) Date: Sep. 26, 2022

(87) PCT Pub. No.: WO2021/191649
PCT Pub. Date: Sep. 30, 2021

(65) Prior Publication Data
US 2023/0115990 A1  Apr. 13, 2023

(51) Int. Cl.
*B60W 30/14* (2006.01)
*G06V 20/58* (2022.01)
*G08G 1/09* (2006.01)

(52) U.S. Cl.
CPC ............. *B60W 30/14* (2013.01); *G06V 20/58* (2022.01); *G08G 1/09* (2013.01); *B60W 2420/403* (2013.01)

(58) Field of Classification Search
CPC .......... B60W 30/14; B60W 60/00253; B60W 60/00256; B60W 2420/403;
(Continued)

(56) References Cited

U.S. PATENT DOCUMENTS 11,628,828 B2  4/2023  Seki
2017/0153714 A1  6/2017  Gao et al.
(Continued)

FOREIGN PATENT DOCUMENTS

DE  102012201038 A1  7/2013
DE  10 2014 218002 A1  3/2016
(Continued)

*Primary Examiner* — Peter D Nolan
*Assistant Examiner* — Ce Li Li
(74) *Attorney, Agent, or Firm* — Osha Bergman Watanabe & Burton LLP

(57) ABSTRACT

A stop position control system of the present invention includes a controller configured to control the stop position of a stop vehicle that is to stop in a stop area. In the stop position control system, vehicle information on the stop vehicle and luggage information on luggage possessed by a user who is using the stop vehicle are acquired, a necessary stop interval required for loading/unloading the user's luggage from the stop vehicle in the stop area is set based on the vehicle information and the luggage information, and the necessary stop interval is transmitted to an adjacent vehicle that is to stop adjacent to the stop vehicle.

12 Claims, 6 Drawing Sheets

(58) Field of Classification Search
CPC .......... B60W 2556/65; B60W 2754/30; G06V 20/52; G06V 20/58; G08G 1/0112; G08G 1/0116; G08G 1/0133; G08G 1/0145; G08G 1/09; G08G 1/096716; G08G 1/096725; G08G 1/096741; G08G 1/096775; G08G 1/202
See application file for complete search history.

(56) References Cited

U.S. PATENT DOCUMENTS

| | | | |
|---|---|---|---|
| 2019/0303805 A1 | 10/2019 | Mizutani et al. | |
| 2020/0101967 A1 | 4/2020 | Seki | |
| 2021/0284152 A1* | 9/2021 | Koike | B60W 30/14 |

FOREIGN PATENT DOCUMENTS

| | | |
|---|---|---|
| DE | 10 2015 012762 A1 | 5/2016 |
| DE | 10 2017 220 567 A1 | 5/2019 |
| JP | 2009051267 A | 3/2009 |
| JP | 2009-190560 A | 8/2009 |
| JP | 2020052942 A | 4/2020 |
| WO | 2018/007065 A1 | 1/2018 |

* cited by examiner

FIG. 3

| SIZE | LUGGAGE TYPE | STORAGE LOCATION | STOP INTERVAL |
|---|---|---|---|
| SMALL SIZE (SMALLER THAN FIRST PREDETERMINED RANGE: LESS THAN 55 cm × 40 cm × 25 cm) | BACKPACK | SEAT | MINIMUM STOP INTERVAL (MINIMALLY REQUIRED STOP INTERVAL: 50 cm) |
| | BAG | SEAT | MINIMUM STOP INTERVAL |
| | SHOPPING BAG | SEAT | MINIMUM STOP INTERVAL |
| MEDIUM SIZE (FIRST PREDETERMINED RANGE OR LARGER AND SMALLER THAN SECOND PREDETERMINED RANGE: LESS THAN 1 m) | SUITCASE (M, L SIZES) | TRUNK | FIRST STOP INTERVAL (STOP INTERVAL IN WHICH TRUNK CAN BE OPENED: 1.5 m) |
| | CARDBOARD BOX | TRUNK | FIRST STOP INTERVAL |
| | MUSICAL INSTRUMENT (GUITAR ETC.) | TRUNK | FIRST STOP INTERVAL |
| | GOLF EQUIPMENT | TRUNK | FIRST STOP INTERVAL |
| LARGE SIZE (SECOND PREDETERMINED RANGE OR LARGER: 1 m OR MORE) | WHEELCHAIR | TRUNK | SECOND STOP INTERVAL (STOP INTERVAL IN WHICH LARGE LUGGAGE CAN BE LOADED/UNLOADED: 3 m) |
| | BICYCLE | TRUNK | SECOND STOP INTERVAL |
| | STROLLER | TRUNK | SECOND STOP INTERVAL |

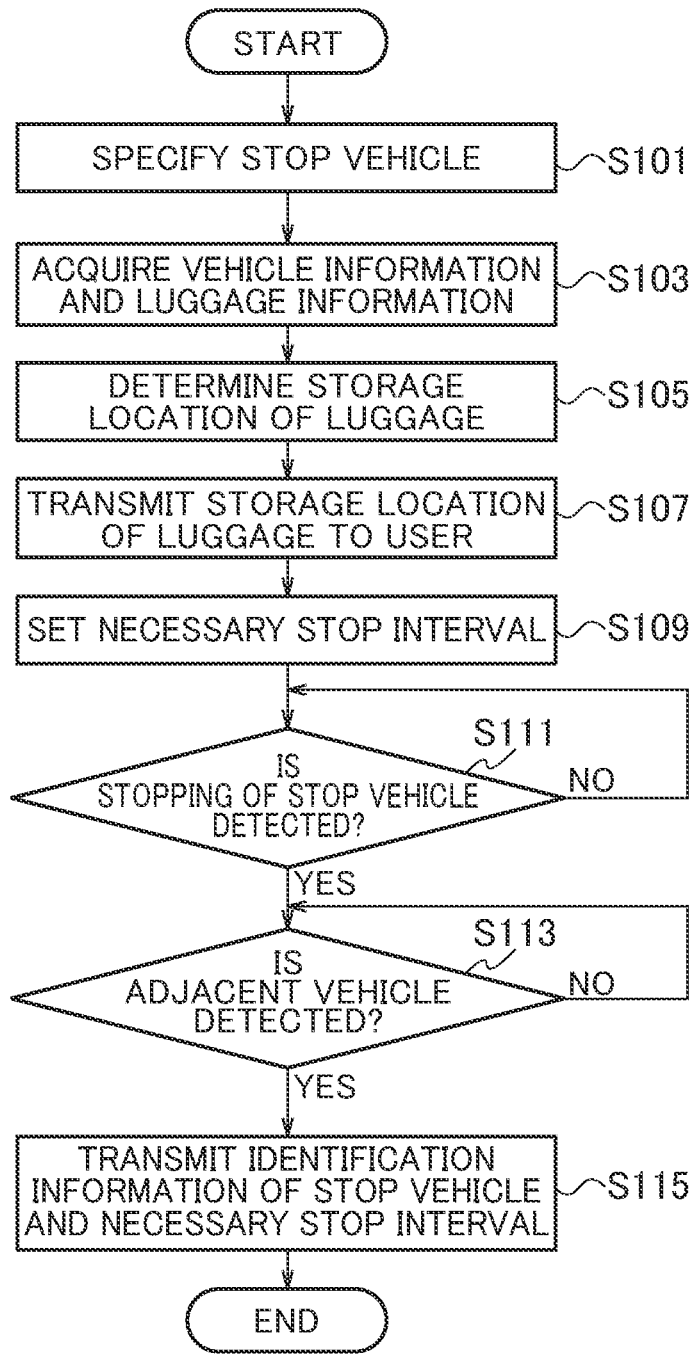

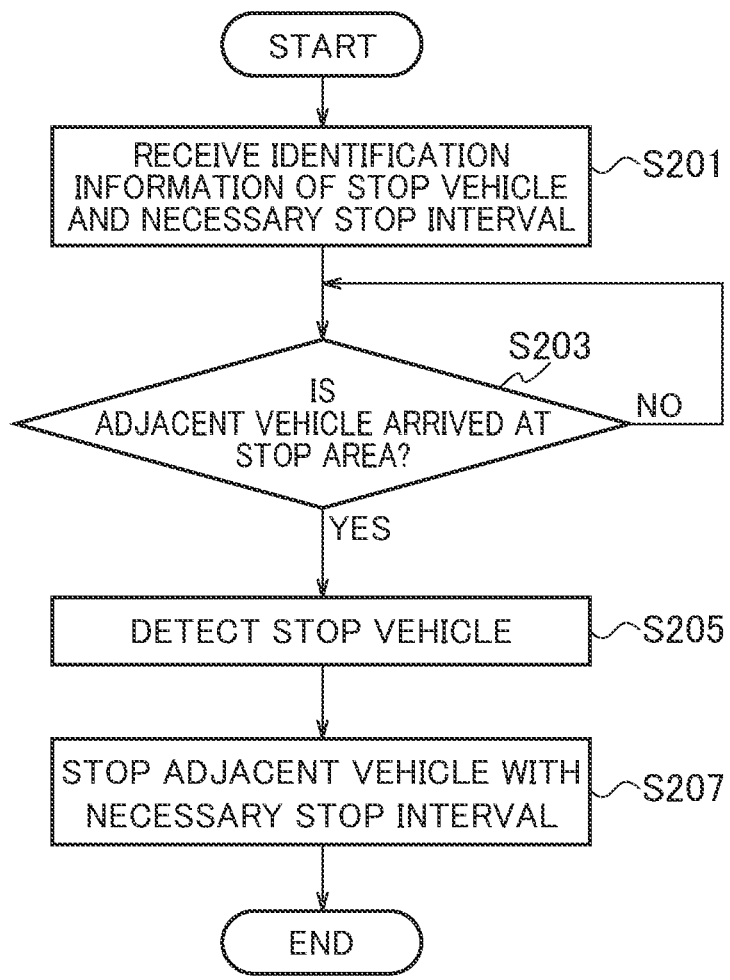

STOP POSITION CONTROL SYSTEM, STOP POSITION CONTROL METHOD, AND STOP POSITION CONTROL DEVICE

TECHNICAL FIELD

The present invention relates to a stop position control system, a stop position control method, and a stop position control device for controlling the stop position of a vehicle that is to stop in a stop area.

BACKGROUND ART

In the past, Patent Literature 1 disclosed a parking assistance device that provides guidance to an appropriate getting-off position for safely opening and closing a trunk. The parking assistance device disclosed in Patent Literature 1 detects an obstacle present in the vicinity of a parking target position, before the host-vehicle is parked. Suppose that the detected obstacle will become an obstruction for the vehicle parked at the parking target position when opening and closing the trunk. In the above case, the parking assistance device calculates a prior getting-off position where the obstacle will not become an obstruction when opening and closing the trunk.

CITATION LIST

Patent Literature

Patent Literature 1 Japanese Unexamined Patent Application Publication No. 2009-190560

SUMMARY OF THE INVENTION

Technical Problem

However, in the conventional parking assistance device described above, it is assumed that an obstacle is present in the parking space, and it is not assumed that business vehicles such as taxis stop and line up in a stop area. Therefore, in the past, when a plurality of vehicles are parked side by side in a stop area, there has been a problem that, after the host-vehicle is parked, another vehicle is parked adjacent to the host-vehicle, and therefore a stop interval required for loading/unloading luggage from the host-vehicle is not able to be sufficiently ensured.

The present invention has been proposed in view of the above described problem, and an object of the present invention is to provide a stop position control system, a stop position control method, and a stop position control device capable of ensuring a stop interval in accordance with a user's luggage between a user vehicle and an adjacent vehicle.

Technical Solution

In order to solve the above described problem, in a stop position control system according to an aspect of the present invention, vehicle information on a stop vehicle and luggage information on luggage possessed by a user who is using the stop vehicle are acquired. A necessary stop interval required for loading/unloading the luggage of the user from the stop vehicle in the stop area is set based on the vehicle information and the luggage information. The necessary stop interval is transmitted to an adjacent vehicle stopping adjacent to the stop vehicle.

Advantageous Effect of the Invention

According to the present invention, it is possible to perform control such that an adjacent vehicle which is to stop adjacent to a stop vehicle stops by ensuring a sufficient stop interval to the stop vehicle depending on luggage information of the stop vehicle.

BRIEF DESCRIPTION OF THE DRAWINGS

FIG. 3 is a diagram for explaining a method of setting a necessary stop interval performed by a stop position control system according to a first embodiment of the present invention.

FIG. 4 is a flowchart showing a process procedure of a process for controlling a stop position performed by a stop position control system according to a first embodiment of the present invention.

FIG. 5 is a flowchart showing a process procedure of a process for controlling a stop position performed by a stop position control system according to a first embodiment of the present invention.

DESCRIPTION OF EMBODIMENTS

First Embodiment

Figure 1:
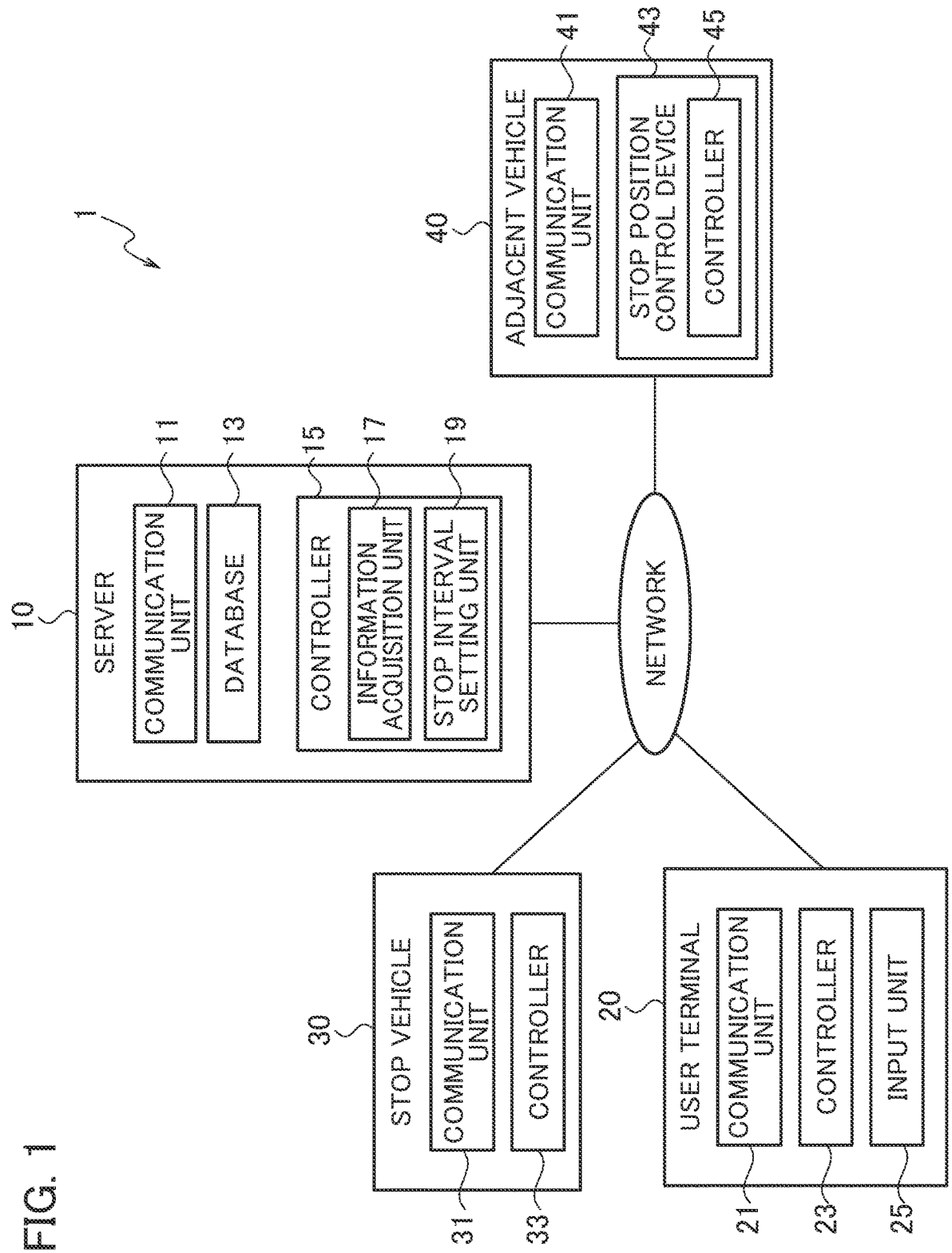
FIG. 1 is a block diagram showing a configuration of a stop position control system according to a first embodiment of the present invention.

Hereinafter, a first embodiment to which the present invention is applied will be described with reference to the drawings. In the descriptions of the drawings, the same parts are denoted by the same reference numerals and description thereof is omitted.

[Configuration of Stop Position Control System]

FIG. 1 is a block diagram showing a configuration of a stop position control system according to the present embodiment. As shown in FIG. 1, a stop position control system 1 according to the present embodiment includes a server 10 that controls the stop position of a stop vehicle that is to stop in a stop area. The server 10 is connected, via a wireless or wired network, to a user terminal 20, a stop vehicle 30 which is used by a user, and an adjacent vehicle 40 which is to stop adjacent to the stop vehicle 30 in a stop area. The network may be, for example, the Internet and may use a mobile communication function such as 4G/LTE and 5G. The adjacent vehicle means a vehicle which is to stop adjacent to the stop vehicle, for example, a vehicle that is to stop adjacent to the rear or the sides of the stop vehicle. In the present embodiment, a description will be given by taking an example where the adjacent vehicle 40 is a vehicle that is to stop adjacent to the rear of the stop vehicle.

Figure 2:
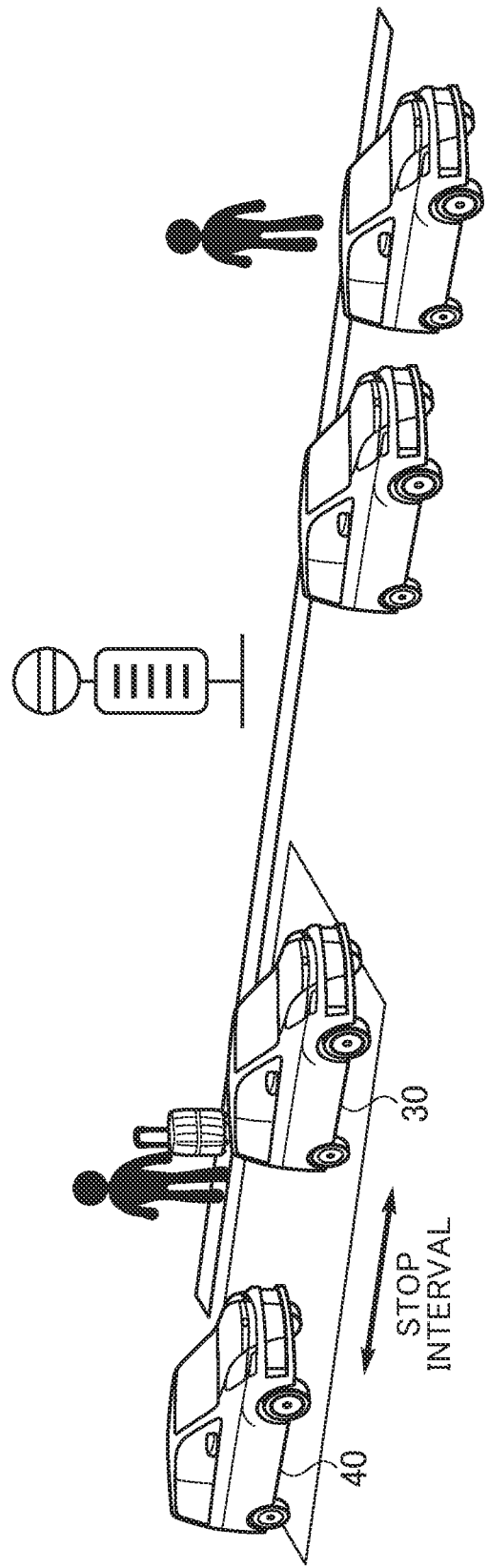
FIG. 2 is a diagram for explaining the control of a stop position performed by a stop position control system of the present invention.

When a vehicle such as a taxi arrives at and stops in a stop area as shown in FIG. 2, the stop position control system 1 manages the stop position of each vehicle by setting a stop interval between the arrived vehicle and the following vehicle depending on the amount of luggage of a user who is in the arrived vehicle. In FIG. 2, the stop vehicle 30 used by a user arrives at and stops in a stop area, and then the adjacent vehicle 40 arrives and stops at the stop area.

Suppose that the stop interval between the stop vehicle 30 and the adjacent vehicle 40 is too short. In the above case, if the user has large amount of luggage or large luggage such as a wheelchair, loading/unloading of luggage is not possible. Therefore, the stop position control system 1 sets an appropriate stop interval depending on the amount of luggage of the user so that loading/unloading of luggage can be performed smoothly.

Next, the server 10 will be described. The server 10 controls the stop position of a vehicle that is to stop in a stop area. Specifically, the server 10 sets a stop interval between the stop vehicle 30 and the adjacent vehicle 40 depending on the amount of luggage of a user who is in the stop vehicle 30. As shown in FIG. 1, the server 10 includes a communication unit 11, a database 13, and a controller 15.

The communication unit 11 has a function of transmitting and receiving information via the network. The communication unit 11 acquires predetermined information via the network and records the acquired information in the database 13, the predetermined information being user's luggage information transmitted from the user terminal 20, vehicle information transmitted from the stop vehicle 30, or the like. Further, the communication unit 11 transmits information such as a necessary stop interval calculated by the controller 15 to the user terminal 20, the stop vehicle 30, and the adjacent vehicle 40 via the network.

The database 13 stores information acquired by the communication unit 11. Specifically, the database 13 stores vehicle information acquired from the stop vehicle 30 and luggage information on luggage possessed by a user. When the amount of luggage possessed by a user is determined based on a user image obtained by capturing an image of a user, the database 13 also stores images from a camera of the stop vehicle 30 and a monitoring camera installed in a stop area. Further, when the schedule of a vehicle which is to stop in a stop area is determined in advance, the database 13 also stores a scheduled stop time and the like of the vehicle.

The controller 15 performs a process for controlling a stop position for a vehicle that is to stop in a stop area. Specifically, the controller 15 acquires vehicle information on the stop vehicle 30 and luggage information on luggage possessed by a user who is using the stop vehicle 30. Then the controller 15 sets, based on the acquired vehicle information and luggage information, a necessary stop interval required for loading/unloading the luggage of the user from the stop vehicle 30 in the stop area. The controller 15 transmits the set necessary stop interval to the adjacent vehicle 40 that is to stop adjacent to the rear of the stop vehicle 30. The controller 15 includes an information acquisition unit 17 and a stop interval setting unit 19.

The information acquisition unit 17 acquires vehicle information on the stop vehicle 30 from the stop vehicle 30. The vehicle information includes, as identification information of the stop vehicle 30, for example, a license plate registration number, the color of the vehicle, the type of the vehicle, a number displayed on a door or the like of the vehicle, and the like. Further, the vehicle information also includes the size of the seat and the size of the trunk of the stop vehicle 30, the size of the rear part of the vehicle which is required when opening and closing the trunk, and the like.

Further, the information acquisition unit 17 acquires luggage information on luggage possessed by the user who is using the stop vehicle 30. The luggage information includes at least the type or size of the user's luggage and may include the number of pieces of luggage. Also, the information acquisition unit 17 may acquire luggage information from the user terminal 20 of the user. The information acquisition unit 17 may acquire a user image from a camera of the stop vehicle 30, and analyze the user image to acquire luggage information. Further, the information acquisition unit 17 may acquire a user image by means of a monitoring camera installed in the stop area.

The stop interval setting unit 19 sets, based on the vehicle information and the luggage information, a necessary stop interval required for loading/unloading luggage of the user from the stop vehicle 30 in the stop area. At this time, the stop interval setting unit 19 determines the storage location of the luggage of the user in the stop vehicle 30 based on the type and size of the luggage. The stop interval setting unit 19 sets a necessary stop interval depending on the storage location and the size of the luggage.

How to set a necessary stop interval will be described with reference to FIG. 3. First, the stop interval setting unit 19 determines the storage location of the user's luggage in the stop vehicle 30 based on the type or size of luggage. As shown in FIG. 3, the size of luggage is classified into three sizes of small size, medium size, and large size. The storage location of the luggage is determined depending on the size. The small size is, for example, a size which is smaller than a first predetermined range in which the lengths of three sides are less than 55 cm×40 cm×25 cm. The storage location of the small-sized luggage is in the passenger space in a vehicle such as a seat. Types of luggage include a backpack, a bag, a shopping bag, and the like.

The medium size is a size which is equal to or larger than the first predetermined range and is smaller than a second predetermined range, in which the length of each of three sides is less than 1 m. The storage location of the medium-sized luggage is in the trunk of a vehicle. Types of luggage include a suitcase, a cardboard box, a musical instrument, golf equipment, and the like. The large size is a size which is equal to or larger than the second predetermined range, in which the length of each of the three sides is 1 m or more. The storage location of the large-sized luggage is in the trunk of a vehicle. Types of luggage include a wheelchair, a bicycle, a stroller, and the like.

Accordingly, the stop interval setting unit 19 determines the size or type of luggage from information input to the user terminal 20 or a user image. Then, the stop interval setting unit 19 determines whether the size of the luggage of the user is smaller than the first predetermined range. When the luggage size is smaller than the first predetermined range, the stop interval setting unit 19 determines that the storage location of the luggage of the user is in the passenger space of the stop vehicle 30. Meanwhile, when the size of the user's luggage is equal to or larger than the first predetermined range, the stop interval setting unit 19 determines that the storage location of the luggage of the user is in the trunk of the stop vehicle 30. However, even if the luggage is small size, when the number of pieces of luggage is large and the amount of all pieces of luggage added together is equal to or larger than the first predetermined range, the stop interval setting unit 19 determines that the storage location of the luggage is in the trunk of the stop vehicle 30.

The first predetermined range and the second predetermined range are set according to the size of the seat and the size of the trunk included in the vehicle information. For example, in a vehicle having a wide seat area, the first predetermined range is set to be large. In a vehicle having a wide trunk area, a one-box car, or the like, the second predetermined range is set to be large.

The storage location of the luggage is determined in this way. Suppose that the storage location of the user's luggage is determined to be in the passenger space of the stop vehicle 30, that is, suppose that the luggage is small in size or the type of luggage is a backpack, a bag, or the like. In the above case, the stop interval setting unit 19 sets the necessary stop interval to a minimum stop interval. The minimum stop interval is the stop interval minimally required when two vehicles of a front vehicle and a rear vehicle stop in line with each other in the front-rear direction of the vehicles, and is 50 cm, for example.

When the storage location of the user's luggage is determined to be in the trunk, the stop interval setting unit 19 determines whether the size of the user's luggage is smaller than the second predetermined range. When the luggage size is smaller than the second predetermined range, that is, when the luggage has a medium size, the stop interval setting unit 19 sets the necessary stop interval to a first stop interval. The first stop interval is a distance that is long enough to open and close the trunk of the vehicle, is longer than the minimum stop interval, and is 1.5 m, for example. The first stop interval is set according to the size of the rear of the vehicle that is required when the trunk is opened and closed, the size being included in the vehicle information.

Meanwhile, suppose that the size of the user's luggage is equal to or larger than the second predetermined range, that is, suppose that the luggage is large in size. In the above case, the necessary stop interval is set to a second stop interval. The second stop interval is a distance that is long enough to load/unload large-sized luggage, is longer than the first stop interval, and is 3 m, for example. The second stop interval may be set according to the size of the luggage. For example, a larger space is required for loading/unloading a bicycle than a stroller. Therefore, the second stop interval may be made larger in the case of a bicycle than in the case of a stroller.

In this way, the stop interval setting unit 19 sets the necessary stop interval according to the size or type of the user's luggage. After detecting that loading/unloading of the user's luggage to/from the stop vehicle 30 has been completed, the stop interval setting unit 19 sets the necessary stop interval to the minimum stop interval.

After the necessary stop interval is set in this way, the stop interval setting unit 19 detects the adjacent vehicle 40 after the stop vehicle 30 stops in the stop area, and transmits the set necessary stop interval to the detected adjacent vehicle 40. For example, the stop interval setting unit 19 detects, as the adjacent vehicle 40, a vehicle that travels toward the stop area within a predetermined range of the stop area after the stop vehicle 30 arrives at and stops in the stop area, and transmits the necessary stop interval to the detected adjacent vehicle 40. However, there is a case where an expected arrival time at which the stop vehicle 30 is to arrive at the stop area is known in advance from a vehicle dispatch schedule or the like, and another vehicle which is to arrive at the stop area after the expected arrival time is also known. In such a case, the adjacent vehicle 40 may be detected before the stop vehicle 30 stops in the stop area and the necessary stop interval may be transmitted to the detected adjacent vehicle 40.

The controller 15 is composed of a general-purpose electronic circuit including a microcomputer, a microprocessor, and a CPU, and a peripheral device such as a memory. The controller 15 has a function of controlling the stop position of a vehicle that is to stop in the stop area. Each function of the controller can be implemented by one or more processing circuits. The processing circuits include a programmed processing device such as a processing device including, for example, an electronic circuit. The processing circuits also include devices such as an application specific integrated circuit (ASIC) that are arranged to perform functions described in the embodiments and conventional circuit components.

Next, the user terminal 20 will be described. The user terminal 20 is a device that can access the server 10 via the network. The user terminal 20 is, for example, a portable terminal (a smartphone, a tablet, or the like) that is used by a user on a daily basis. An application is installed in the user terminal 20, the application being necessary for performing a stop position control service that is provided by the server 10. Therefore, the user terminal 20 can transmit necessary information to the server 10, and can receive and display information transmitted from the server 10. As shown in FIG. 1, the user terminal 20 includes a communication unit 21, a controller 23, and an input unit 25.

The communication unit 21 has a function of transmitting and receiving information to and from the server 10 and the stop vehicle 30 via the network. The communication unit 21 stores the received information in a memory (not shown) or the like, and transmits predetermined information such as luggage information. For example, the communication unit 21 may be a device with a mobile communication function such as 4G/LTE.

The controller 23 receives luggage information on luggage possessed by a user based on a user operation to the input unit 25. The type of luggage, the size of luggage, the number of pieces of luggage, and the like are input as the luggage information. Examples of the type of luggage include, for example, a backpack, a bag, a suitcase, a wheelchair, a stroller, and the like. Examples of the size of luggage include, for example, a small size in which three sides are less than 55 cm×40 cm×25 cm, a medium size in which each of the three sides is less than 1 m, and a large size in which each of the three sides is 1 m or longer.

The controller 23 is a general-purpose microcomputer that includes a CPU (central processing unit), a memory, and an input/output unit. A computer program for causing the controller 23 to function as a part of the user terminal 20 is installed in the controller 23. By executing the computer program, the controller 23 controls the communication unit 21. Various types of information processes of the controller 23 may be realized by software or dedicated hardware.

The input unit 25 receives user operations corresponding to various commands from the user. For example, the input unit 25 may be an input interface with a plurality of buttons or a touch panel having a touch interface.

Next, the stop vehicle 30 will be described. The stop vehicle 30 is a vehicle which arrives at and stops in a stop area, and is used by a user who possesses luggage. The stop vehicle 30 may be a vehicle that arrives at and stops in a stop area with a user already in the vehicle, or a vehicle that a user gets on after the vehicle arrives at and stops in a stop area. That is, the stop vehicle 30 may be a vehicle onto which a user's luggage is to be loaded, or a vehicle from which a user's luggage is to be unloaded. Further, the stop vehicle 30 may be a vehicle which carries only luggage without a user getting on the vehicle. Therefore, the stop vehicle 30 is not limited to a taxi, and may be a vehicle for delivering luggage. The stop vehicle 30 may be an automatic driving vehicle or a vehicle driven by a driver.

As shown in FIG. 1, the stop vehicle 30 includes a communication unit 31 and a controller 33. The communication unit 31 has a function of transmitting and receiving information to and from the server 10, the user terminal 20, and the adjacent vehicle 40 via the network. The communication unit 31 stores the received information in a memory (not shown) or the like, and transmits predetermined information such as vehicle information. For example, the communication unit 31 may be a device with a mobile communication function such as 4G/LTE.

The controller 33 transmits vehicle information on the stop vehicle 30 via the communication unit 31 in response to a request from the server 10. Further, the controller 33 captures an image of a user by using a camera installed in the stop vehicle 30, and transmits the captured user image to the server 10.

The controller 33 is a general-purpose microcomputer that includes a CPU (central processing unit), a memory, and an input/output unit. A computer program for causing the controller 33 to function in response to a request from the server 10 is installed in the controller 33. By executing the computer program, the controller 33 controls the communication unit 31. Various types of information processes of the controller 33 may be realized by software or dedicated hardware.

Next, the adjacent vehicle 40 will be described. The adjacent vehicle 40 arrives at the stop area and stops adjacent to the rear of the stop vehicle 30. The adjacent vehicle 40 may be an automatic driving vehicle or a vehicle that is driven by a driver.

As shown in FIG. 1, the adjacent vehicle 40 includes a communication unit 41 and is mounted with a stop position control device 43. The communication unit 41 has a function of transmitting and receiving information to and from the server 10, the user terminal 20, and the stop vehicle 30 via the network. The communication unit 41 stores received information such as vehicle information and the necessary stop interval in a memory (not shown) or the like, and transmits predetermined information. For example, the communication unit 41 may be a device with a mobile communication function such as 4G/LTE.

The stop position control device 43 is mounted on the adjacent vehicle 40 and includes a controller 45 that controls the stop position of the adjacent vehicle 40. The controller 45 acquires, from the server 10, vehicle information on the stop vehicle 30 and the necessary stop interval required for loading/unloading luggage of a user from the stop vehicle 30 in a stop area. After the adjacent vehicle 40 arrives at a stop area, the stop vehicle 30 is detected based on the vehicle information. The adjacent vehicle 40 is stopped adjacent to the rear of the detected stop vehicle 30 such that the stop interval to the stop vehicle 30 is the necessary stop interval.

The controller 45 is a general-purpose microcomputer that includes a CPU (central processing unit), a memory, and an input/output unit. A computer program for controlling the stop position of the adjacent vehicle 40 is installed in the controller 45. By executing the computer program, the controller 45 controls the communication unit 41 and also controls the stop position of the adjacent vehicle 40. Various types of information processes of the controller 45 may be realized by software or dedicated hardware.

[Method for Controlling Stop Position]

Next, a stop position control method performed by the stop position control system 1 according to the present embodiment will be described. FIG. 4 is a flowchart showing process procedures of a process for controlling a stop position performed by the stop position control system 1 according to the present embodiment.

As shown in FIG. 4, in step S101, the server 10 specifies a vehicle that is traveling toward a stop area as the stop vehicle 30 that is to stop in the stop area. For example, suppose that, when a user gets on a taxi by using a vehicle dispatch service, the destination of the user is set to a stop area that is managed by the stop position control system 1.

In the above case, the taxi is specified as the stop vehicle 30. When the user has called a taxi to the stop area by using a vehicle dispatch service, the taxi that has been called is specified as the stop vehicle 30.

In step S103, the server 10 acquires vehicle information on the stop vehicle 30 and luggage information on luggage possessed by the user who is using the stop vehicle 30. The vehicle information includes identification information of the stop vehicle 30, the size of the seat, the size of the trunk, the size to the rear of the vehicle which is required when opening and closing the trunk, and the like. The luggage information includes at least the type or size of the user's luggage, and further includes the number of pieces of luggage. The server 10 may acquire luggage information that is input by the user to the user terminal 20. Alternatively, the server 10 may acquire a user image obtained by capturing an image of the user from the stop vehicle 30 and analyze the user image to acquire luggage information. Also, when the user has called a taxi to the stop area, a user image may be acquired from a monitoring camera installed in the stop area.

In step S105, the server 10 determines the storage location of the user's luggage in the stop vehicle 30 based on the type or size of the luggage. As shown in FIG. 3, the size of luggage is classified into three sizes of small size, medium size, and large size. Therefore, the server 10 determines the storage location of the luggage depending on the size. For example, the small-sized type of luggage is a backpack, a bag, or a shopping bag. Therefore, the storage location of the luggage is determined to be in a passenger space in the vehicle, for example, on a seat. The medium-sized type of luggage is a suitcase, a cardboard box, a musical instrument, or golf equipment. Therefore, the storage location of the luggage is determined to be in the trunk of the vehicle. The large-sized type of luggage is a wheelchair, a bicycle, or a stroller. Therefore, the storage location of the luggage is determined to be in the trunk of the vehicle.

In step S107, the server 10 transmits the storage location of the luggage determined in step S105 to the user terminal 20 of the user.

In step S109, the server 10 sets the necessary stop interval required for loading/unloading the user's luggage from the stop vehicle 30 in the stop area. As shown in FIG. 3, the server 10 sets the necessary stop interval to the minimum stop interval, in a case where the storage location of the user's luggage is determined to be on a seat in the stop vehicle 30, that is, in a case where the luggage is small in size. The server 10 determines whether the size of the user's luggage is smaller than the second predetermined range in a case where the storage location of the user's luggage is determined to be in the trunk. When the size is smaller than the second predetermined range, that is, when the luggage has a medium size, the server 10 sets the necessary stop interval to a first stop interval. Meanwhile, when the size is equal to or larger than the second predetermined range, that is, when the luggage is large in size, the server 10 sets the necessary stop interval to a second stop interval.

In step S111, the server 10 determines whether the stop vehicle 30 has arrived at and stopped in the stop area, and after detecting that the stop vehicle 30 has stopped in the stop area, the process proceeds to step S113. The server 10 receives location information of the stop vehicle 30 and determines whether the stop vehicle 30 has arrived at and stopped in the stop area.

In step S113, the server 10 determines whether an adjacent vehicle 40 that is to stop adjacent to the rear of the stop vehicle 30 can be detected. When an adjacent vehicle 40 can be detected, the process proceeds to step S115. The server 10 detects, as the adjacent vehicle 40, a vehicle that is traveling toward the stop area among vehicles that are traveling within a predetermined range of the stop area.

In the present embodiment, the adjacent vehicle 40 is detected after the stop vehicle 30 stops in the stop area. However, alternatively the adjacent vehicle 40 may be detected before the stop vehicle 30 stops in the stop area. For example, suppose that an expected arrival time at which the stop vehicle 30 is to arrive at the stop area is known in advance based on a vehicle dispatch schedule or the like, and a vehicle which is to arrive at the stop area after the expected arrival time is also known. In the above case, the adjacent vehicle 40 may be detected before the stop vehicle 30 stops in the stop area.

In step S115, the server 10 transmits identification information of the stop vehicle 30 and the necessary stop interval to the adjacent vehicle 40 detected in step S113, and then ends the process for controlling a stop position according to the present embodiment.

[Method for Controlling Stop Position]

Next, a stop position control method performed by the stop position control device 43 according to the present embodiment will be described. FIG. 5 is a flowchart showing process procedures of a process for controlling a stop position performed by the stop position control device 43 according to the present embodiment.

As shown in FIG. 5, in step S201, the controller 45 of the stop position control device 43 receives and acquires identification information of the stop vehicle 30 and the necessary stop interval from the server 10 of the stop position control system 1.

In step S203, the controller 45 determines whether the adjacent vehicle 40 has arrived at the stop area. When the adjacent vehicle 40 has arrived at the stop area, the process proceeds to step S205.

In step S205, the controller 45 detects the stop vehicle 30 among vehicles that have stopped in the stop area based on identification information. Then, in step S207, the controller 45 causes the adjacent vehicle 40 to stop adjacent to the rear of the detected stop vehicle 30 such that the stop interval to the stop vehicle 30 becomes the necessary stop interval.

At this time, when the adjacent vehicle 40 is an automatic driving vehicle, the controller 45 detects the stop vehicle 30 from identification information such as a license plate registration number. The controller 45 instructs the automatic driving vehicle to stop adjacent to the rear of the detected stop vehicle 30 such that the stop interval between the vehicles becomes the necessary stop interval. Alternatively, when the adjacent vehicle 40 is not an automatic driving vehicle, identification information is displayed on a display for the driver to find the stop vehicle 30. After the driver finds the stop vehicle 30, the controller 45 displays an instruction on the display, which instructs the driver to stop the adjacent vehicle 40 adjacent to the rear of the stop vehicle 30. At this time, the controller 45 instructs the driver by using highlighting on the display such that the stop interval to the stop vehicle 30 becomes the necessary stop interval. In this way, after the adjacent vehicle 40 stops adjacent to the rear of the stop vehicle 30 such that the stop interval to the stop vehicle 30 becomes the necessary stop interval, the process for controlling a stop position according to the present embodiment is ended.

[Effect of First Embodiment]

As described above in detail, in the stop position control system 1 according to the present embodiment, vehicle information on a stop vehicle and luggage information on luggage possessed by a user who is using the stop vehicle are acquired. The necessary stop interval required for loading/unloading the user's luggage from the stop vehicle in a stop area is set based on the vehicle information and the luggage information. The necessary stop interval is transmitted to an adjacent vehicle that is to stop adjacent to the stop vehicle. This can sufficiently ensure the stop interval required for loading/unloading the user's luggage from the vehicle between vehicles that stop and line up in the stop area. Accordingly, it is possible to load/unload luggage smoothly in the stop area.

In the stop position control system 1 according to the present embodiment, luggage information includes at least the type or size of the user's luggage. The storage location of the user's luggage in the stop vehicle is determined based on the type or size of luggage. This can accurately set the stop interval required for loading/unloading luggage depending on the storage location of the luggage.

Further, in the stop position control system 1 according to the present embodiment, it is determined whether the size of the user's luggage is smaller than the first predetermined range. When the luggage size is smaller than the first predetermined range, the storage location of the user's luggage is determined to be in a passenger space of the stop vehicle. Meanwhile, when the luggage size is equal to or larger than the first predetermined range, the storage location of the user's luggage is determined to be in the trunk of the stop vehicle. This can accurately determine whether the storage location of the luggage is in the passenger space or in the trunk based on the first predetermined range set in advance.

Further, in the stop position control system 1 according to the present embodiment, the necessary stop interval is set to the minimum stop interval in a case where the storage location of the user's luggage is determined to be in the passenger space of the stop vehicle. This eliminates the necessity of increasing the stop interval for loading/unloading luggage, when the storage location of the luggage is on a seat. Therefore, the necessary stop interval is set to the minimum interval, and the stopping space can be effectively used.

Further, in the stop position control system 1 according to the present embodiment, it is determined whether the size of the user's luggage is smaller than the second predetermined range that is larger than the first predetermined range in a case where the storage location of the luggage is determined to be in the trunk of the stop vehicle. When the size of the user's luggage is smaller than the second predetermined range, the necessary stop interval is set to a first stop interval that is longer than the minimum stop interval. When the size of the user's luggage is equal to or larger than the second predetermined range, the necessary stop interval is set to a second stop interval that is longer than the first stop interval. This increases the necessary stop interval according to the increase in the size of luggage. Accordingly, even if the user's luggage is large in size, it is possible to sufficiently ensure the stop interval required for loading/unloading luggage.

Further, in the stop position control system 1 according to the present embodiment, when the controller detects that loading/unloading of the user's luggage from the stop vehicle has been completed, the necessary stop interval is set to the minimum stop interval. Therefore, after the completion of loading/unloading of luggage, the necessary stop interval is set to the minimum interval to effectively use the stopping space.

Further, in the stop position control system 1 according to the present embodiment, luggage information is acquired from a user terminal of the user. This allows the easy acquisition of the amount of luggage possessed by the user.

Further, in the stop position control system 1 according to the present embodiment, a user image obtained by capturing an image of the user is acquired, and the acquired user image is analyzed to acquire luggage information. This eliminates the necessity for the user to input luggage information. Therefore, the convenience of the user can be enhanced.

Further, in the stop position control system 1 according to the present embodiment, an adjacent vehicle is detected after the stop vehicle stops in the stop area, and the necessary stop interval is transmitted. This detects, as an adjacent vehicle, the vehicle closest to the stop area when the stop vehicle stops in the stop area. Accordingly, an adjacent vehicle can be accurately detected.

Further, in the stop position control system 1 according to the present embodiment, an adjacent vehicle is detected before the stop vehicle stops in the stop area, and the necessary stop interval is transmitted. This can specify an adjacent vehicle at an early stage. Therefore, the stopping space required in the stop area can be reliably ensured.

Further, the stop position control device 43 according to the present embodiment acquires, from the stop position control system, vehicle information on the stop vehicle and the necessary stop interval required for loading/unloading the user's luggage from the stop vehicle in the stop area. The stop vehicle is detected based on the vehicle information when an adjacent vehicle arrives at the stop area. The adjacent vehicle is stopped adjacent to the detected stop vehicle such that the stop interval to the stop vehicle becomes the necessary stop interval. This can sufficiently ensure the stop interval required for loading/unloading the user's luggage from the vehicle between vehicles that stop and line up in the stop area. Therefore, it is possible to load/unload luggage smoothly in the stop area.

Second Embodiment

A second embodiment to which the present invention is applied will be described below with reference to the drawings. In the drawings, the same parts are denoted by the same reference numerals and description thereof is omitted.
[Configuration of Stop Position Control System]

Figure 6:
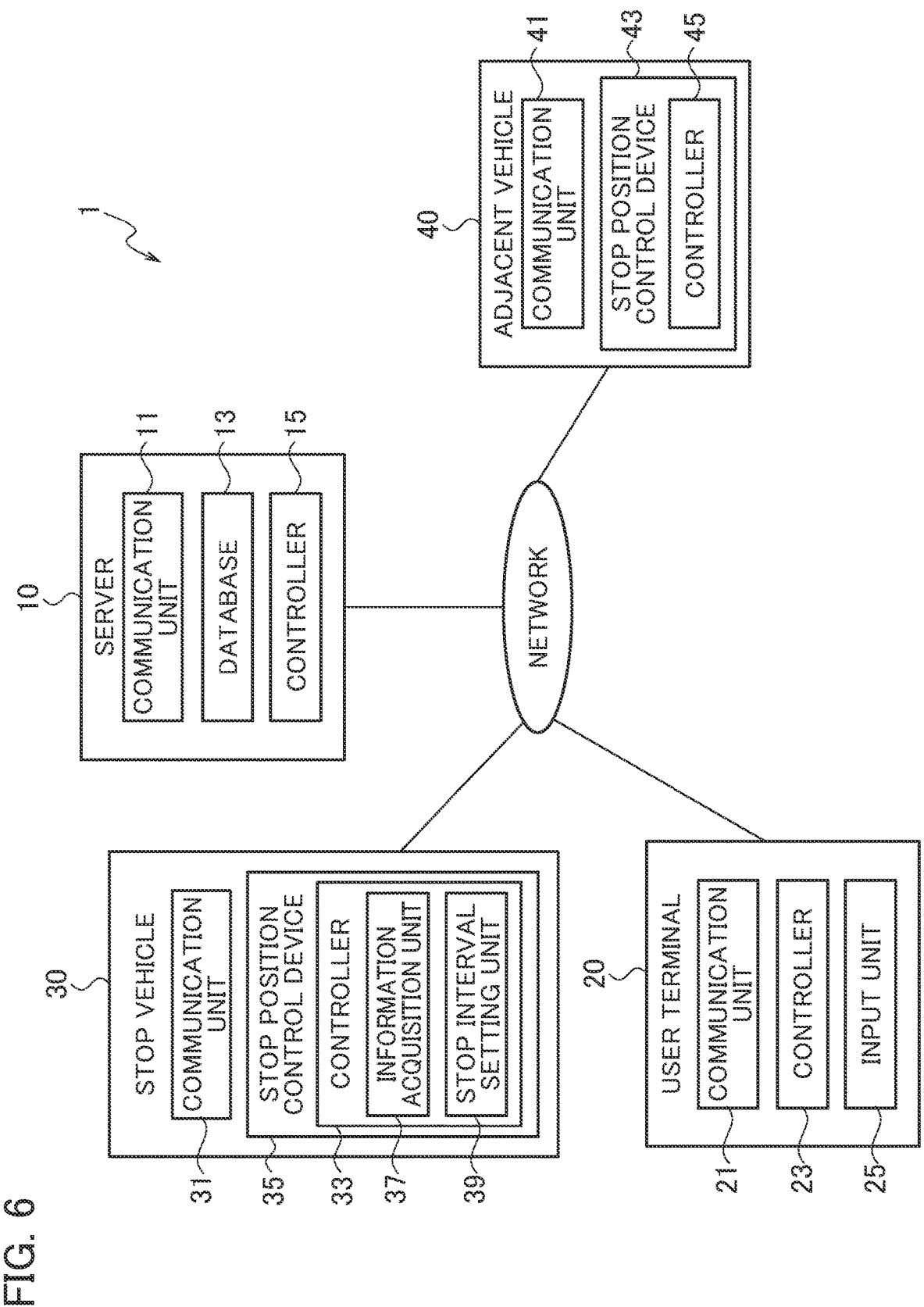
FIG. 6 is a block diagram showing a configuration of a stop position control system according to a second embodiment of the present invention.

FIG. 6 is a block diagram showing a configuration of a stop position control system according to the present embodiment. As shown in FIG. 6, a stop position control system 1 according to the present embodiment differs from that in the first embodiment in that a stop position control device 35 is mounted on a stop vehicle 30. Therefore, while in the first embodiment, the server 10 performs the process for controlling a stop position, in the present embodiment, the controller 33 of the stop position control device 35 performs a process for controlling a stop position.

The controller 33 includes an information acquisition unit 37 and a stop interval setting unit 39. However, a detailed description of the units will be omitted because the configurations of the units are the same as those of the information acquisition unit 17 and the stop interval setting unit 19 of the first embodiment shown in FIG. 1. Further, the controller 33 may communicate with the user terminal 20 and the adjacent vehicle 40 directly or via the server 10. Particularly, the controller 33 may transmit the set necessary stop interval to the adjacent vehicle 40 via the server 10.
[Stop Position Control Method]

Next, a stop position control method performed by the stop position control device 35 according to the present embodiment will be described. A process for controlling a stop position performed by the stop position control device 35 according to the present embodiment is the same as the process for controlling a stop position according to the first embodiment shown in FIG. 4. However, while in the first embodiment, the server 10 performs the process for controlling a stop position, in the present embodiment, the controller 33 performs the process for controlling a stop position. Therefore, in the description of the process for controlling a stop position, it is necessary to replace the server 10 with the controller 33.
[Stop Position Control Method]

Next, a stop position control method performed by a stop position control device 43 according to the present embodiment will be described. The process for controlling a stop position performed by the stop position control device 43 according to the present embodiment is the same as the process for controlling a stop position according to the first embodiment shown in FIG. 5.
[Effect of Second Embodiment]

As described above in detail, the stop position control device 35 according to the present embodiment acquires vehicle information on a stop vehicle and luggage information on luggage possessed by a user who is using the stop vehicle. The necessary stop interval required for loading/unloading the user's luggage from the stop vehicle in a stop area is set based on the vehicle information and the luggage information. The necessary stop interval is transmitted to an adjacent vehicle that is to stop adjacent to the stop vehicle. This can sufficiently ensure the stop interval required for loading/unloading the user's luggage from the vehicle between vehicles that stop and line up in the stop area. Therefore, it is possible to load/unload luggage smoothly in the stop area.

Further, the stop position control device 35 according to the present embodiment transmits the necessary stop interval to the adjacent vehicle via a server in a stop position control system. This can reliably transmit the necessary stop interval to the adjacent vehicle via the server.

The above described embodiments are examples of the present invention. For this reason, the present invention is not limited to the above described embodiments, and even in forms other than the above described embodiments, it is needless to say that various modifications are possible according to designs and the like within a scope not departing from a technical idea according to the present invention.

REFERENCE SIGNS LIST

1 Stop position control system
10 Server
11, 21, 31, 41 Communication unit
13 Database
15, 23, 33, 45 Controller
17, 37 Information acquisition unit
19, 39 Stop interval setting unit
20 User terminal
25 Input unit
30 Stop vehicle
35, 43 Stop position control device
40 Adjacent vehicle

The invention claimed is:
1. A stop position control system comprising:
a stop vehicle that is to stop in a stop area; and a controller configured to control a stop position of the stop vehicle, wherein the controller is configured to:
- acquire vehicle information on the stop vehicle,
- acquire luggage information on luggage possessed by a user who is using the stop vehicle,
- set, based on the vehicle information and the luggage information, a necessary stop interval required for loading/unloading the luggage of the user from the stop vehicle in the stop area,
- transmit the necessary stop interval to an adjacent vehicle, the adjacent vehicle being a stop vehicle other than the stop vehicle and stopping adjacent to the stop vehicle,
- set the necessary stop interval to a minimum stop interval when detecting that loading/unloading of the luggage of the user from the stop vehicle is completed.

2. The stop position control system according to claim 1, wherein
- the luggage information includes at least a type or a size of the luggage of the user, and
- the controller is configured to determine a storage location of the luggage of the user in the stop vehicle based on the type or the size of the luggage.

3. The stop position control system according to claim 2, wherein
- the controller is configured to determine whether the size of the luggage of the user is smaller than a first predetermined range,
- when the size is smaller than the first predetermined range, determine that the storage location of the luggage of the user is in a passenger space of the stop vehicle, and
- when the size is equal to or larger than the first predetermined range, determine that the storage location of the luggage of the user is in a trunk of the stop vehicle.

4. The stop position control system according to claim 3, wherein the controller is configured to set the necessary stop interval to the minimum stop interval, in a case where the storage location of the luggage of the user is determined to be in the passenger space of the stop vehicle.

5. The stop position control system according to claim 3, wherein
- the controller is configured to determine whether the size of the luggage of the user is smaller than a second predetermined range that is larger than the first predetermined range, in a case where the storage location of the luggage of the user is determined to be in the trunk of the stop vehicle,
- set the necessary stop interval to a first stop interval that is longer than the minimum stop interval, when the size is smaller than the second predetermined range, and
- set the necessary stop interval to a second stop interval that is longer than the first stop interval, when the size is equal to or larger than the second predetermined range.

6. The stop position control system according to claim 1, wherein the controller is configured to acquire the luggage information from a user terminal of the user.

7. The stop position control system according to claim 1, wherein the controller is configured to acquire a user image obtained by capturing an image of the user and analyze the user image to acquire the luggage information.

8. The stop position control system according to claim 1, wherein the controller is configured to detect the adjacent vehicle after the stop vehicle stops in the stop area and transmit the necessary stop interval.

9. The stop position control system according to claim 1, wherein the controller is configured to detect the adjacent vehicle before the stop vehicle stops in the stop area, and transmit the necessary stop interval.

10. A stop position control method of a stop position control system that comprises a stop vehicle that is to stop in a stop area, a camera configured to capture an image of a user of the stop vehicle, and a controller configured to control a stop position of the stop vehicle, the stop position control method executed by the controller and comprising:
- capturing, with the camera, a user image including luggage of the user;
- detecting, in the user image, a size or type of the luggage of the user;
- storing the size or type of the luggage of the user as luggage information in a memory accessible by the controller;
- acquiring vehicle information on the stop vehicle;
- setting, based on the vehicle information and the luggage information, a necessary stop interval required for loading/unloading the luggage of the user from the stop vehicle in the stop area;
- transmitting the necessary stop interval to an adjacent vehicle, the adjacent vehicle being a stop vehicle other than the stop vehicle and stopping adjacent to the stop vehicle,
- setting the necessary stop interval to a minimum stop interval when detecting that loading/unloading of the luggage of the user from the stop vehicle is completed.

11. A stop position control device that is mounted on a stop vehicle, comprising:
a controller configured to control a stop position of the stop vehicle that is to stop in a stop area, wherein the controller is configured to:
- acquire vehicle information on the stop vehicle,
- acquire luggage information on luggage possessed by a user who is using the stop vehicle,
- set, based on the vehicle information and the luggage information, a necessary stop interval required for loading/unloading the luggage of the user from the stop vehicle in the stop area,
- transmit the necessary stop interval to an adjacent vehicle, the adjacent vehicle being a stop vehicle other than the stop vehicle and stopping adjacent to the stop vehicle,
- set the necessary stop interval to a minimum stop interval when detecting that loading/unloading of the luggage of the user from the stop vehicle is completed.

12. The stop position control device according to claim 11, wherein the controller is configured to transmit the necessary stop interval to the adjacent vehicle via a server.

* * * * *